Oct. 20, 1970   R. R. RUTHERFORD ET AL   3,535,616
TEMPERATURE RESPONSIVE AUTOMOTIVE VOLTAGE REGULATOR
Filed April 8, 1968

INVENTORS
Robert R. Rutherford
David E. Cooper
BY
Mueller, Aichele & Rauner
ATTY'S.

United States Patent Office 3,535,616
Patented Oct. 20, 1970

3,535,616
TEMPERATURE RESPONSIVE AUTOMOTIVE VOLTAGE REGULATOR
Robert R. Rutherford, Phoenix, and David E. Cooper, Scottsdale, Ariz., assignors to Motorola, Inc., Franklin Park, Ill., a corporation of Illinois
Filed Apr. 8, 1968, Ser. No. 719,467
Int. Cl. H02p 9/30
U.S. Cl. 322—28                                    8 Claims

ABSTRACT OF THE DISCLOSURE

A temperature responsive automotive voltage regulator wherein a temperature responsive network is connected between a sense terminal of an automotive voltage supply and a current control circuit to control the charging of the voltage supply as a function of temperature. A current limiter is connected in the temperature responsive network and provides a desired current variation for changes in temperature. Such current variation in turn controls the charging voltage applied to the automotive voltage supply.

BACKGROUND OF THE INVENTION

This invention relates generally to automotive voltage regulators and more particularly to an automotive voltage regulator featuring improved temperature compensation.

When the DC voltage supply, i.e., battery, in an automotive electrical system is regulated, it is frequently desirable to change the regulated voltage as a function of temperature. For example, as the battery temperature increases, a lower battery voltage is required in order to prevent overcharging of the battery. Conversely, when the automobile battery is very cold, a higher charging voltage is required to charge the battery to a level sufficient to maintain the battery at a desirable high charge level and provide sufficient power for starting in a cold condition.

Prior art temperature compensated voltage regulator circuits employed thermistors as the temperature responsive element of the regulator. However, thermistors are generally difficult to match to obtain an overall desired temperature characteristic, and thermistors do not provide the necessary circuit clamping function at extreme temperatures. Additionally, automotive voltage regulators using thermistors do not provide a desired linear slope portion of the charging voltage-versus-temperature characteristic due to a hysteresis effect.

SUMMARY OF THE INVENTION

An object of the present invention is to provide a new and improved voltage regulator circuit featuring improved temperature compensation.

Another object of this invention is to provide a voltage regulator circuit having a minimum number of semiconductive devices and which may be constructed at a minimum cost.

Briefly described, the regulator circuit of the present invention includes a temperature responsive network having a current limiter therein connected to a sense terminal of an automobile DC voltage supply. A current control circuit, including an output Darlington stage, is connected between the temperature responsive network and the DC voltage supply, and the charging current for the voltage supply is regulated by a current limiter in the temperature responsive network. This current limiter controls the duty cycle of the current control circuit.

IN THE DRAWINGS

DESCRIPTION OF THE PREFERRED EMBODIMENTS

Figure 1:
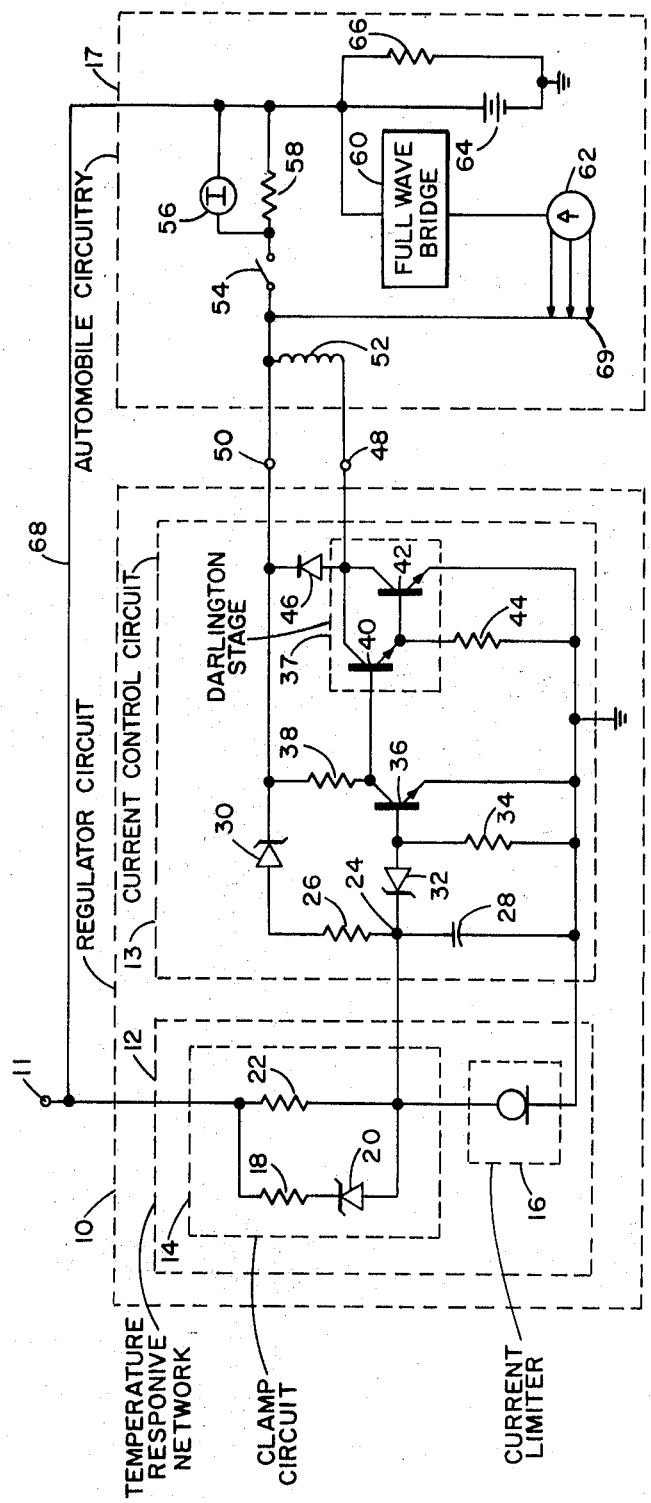
FIG. 1 is a schematic diagram of the voltage regulator circuit embodying the present invention.

Referring to the drawing in detail, the regulator circuit 10 in FIG. 1 includes a temperature responsive network 12 connected between a sense terminal 11 and a current control circuit 13. The temperature responsive network 12 includes a clamp circuit portion 14 and a current limiter 16 which will be described further with reference to the circuit operation. The current control circuit 13 includes an input transistor 36 which is cascaded to a Darlington transistor stage 37, and an input level shifting Zener diode 32 interconnects the temperature responsive network 12 and the current control circuit 13.

The output of the Darlington stage 37 in the current control circuit 13 is connected to an alternator field winding 52 of an AC generator (not shown) of the automotive system. The field winding 52 of the alternator is connected to the output of a three-phase half-wave diode rectifier 69 which rectifies the output of the stator 62 to thereby provide a supply voltage for the field winding 52.

The other output of the stator 62 is rectified by bridge 60 to provide a charging voltage to a DC voltage supply 64 in the automotive system. The automotive load 66 is connected across the DC supply 64 as shown, and a sense terminal 11 at which the DC supply 64 is regulated is connected to the supply 64 via conductor 68.

The Zener diode 30 is an overvoltage protection diode which will clamp the voltage at point 50 if for any reason the battery 64 becomes disconnected from the regulator or the sense line 68 becomes open circuited.

The remaining circuit components shown in FIG. 1 will be identified below with reference to the following description of circuit operation.

OPERATION

Assume initially that it is desired to maintain the voltage at sense terminal 11 at a fixed value and that the DC supply 64 has just dropped below that fixed value. This decrease in supply voltage is coupled through resistor 22, through Zener diode 32 and to the base of input transistor 36 to turn transistor 36 off. When transistor 36 turns off, the voltage at the base of transistor 40 in Darlington stage 37 rises and current now flows through a common resistor 38 and through transistors 40 and 42. When transistor 42 conducts to complete a current path through the alternator field winding 52 to ground, the stator 62 input to the full wave bridge 60 is stepped up to produce a compensating increase in charging current to the DC supply 64 and bring the voltage level at sense terminal 11 back up to a desired value.

Suppose now that the voltage level at sense terminal 11 rises above this desired value. This rise in supply voltage produces positive going voltage transition which is coupled through resistor 22, integrated by integrator capacitor 28, and applied through Zener diode 32 to input transistor 36, turning on the latter and turning off the transistors 40 and 42 in the Darlington stage 37. When transistor 42 turns off, the current in the field winding 52 drops to zero and produces a corresponding decrease in the stator's input to the full wave bridge 60. Thus, the DC supply 64 receives less charging current from the bridge 60 as the sense terminal 11 rises above a desired regulated voltage.

When transistor 42 turns off the "flywheel" or "free wheeling" diode 46 conducts to absorb the induced voltage L $di/dt$ in field winding 52 as a result of the abrupt change of current flowing therein.

The light 56 which is connected in parallel between the DC supply 64 and the field winding 52 is turned on by closing the switch 54, i.e., ignition switch of the automobile. The indicating light 56 is turned on when the ignition key is turned, and the resistor 58 prevents excessive current from flowing through the light 56. For a further discussion of the current control circuit 13 and the automobile circuitry 17, see copending application Ser. No. 657,962 of Jack Charles Young filed Aug. 2, 1967, and assigned to the present assignee.

Figure 2:
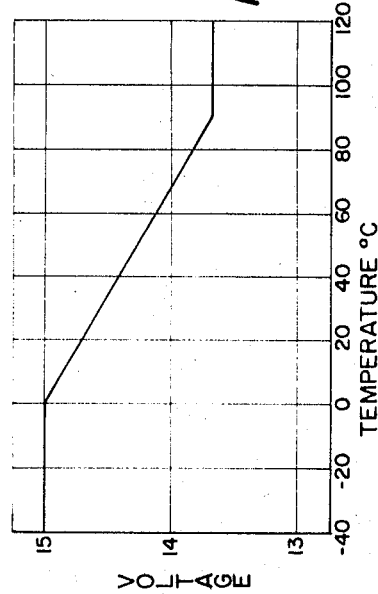
FIG. 2 illustrates the regulated voltage-versus-temperature characteristic of the circuit in FIG. 1.
Figure 3:
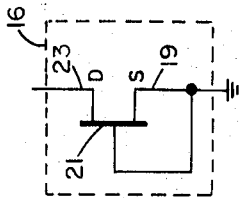
FIG. 3 shows a field-effect diode current limiter which may be used as the current limiter in FIG. 1.

Rather than maintain the level of regulated voltage at sense terminal 11 at a fixed value, it is desired in accordance with the present invention to continuously reduce the voltage at sense terminal 11 as temperature increases and vice versa as shown in FIG. 2. Between —40° C. and 0° C. it is desired to clamp the voltage at sense terminal 11 at approximately 15 volts, and between 0° C. and 90° C. it is desired to linearly reduce the voltage at sense terminal 11. This voltage regulation is accomplished by the novel temperature responsive network 12 including a current limiter 16. The current limiter 16 may, for example, be a field-effect diode having source, gate and drain electrodes 19, 21 and 23, respectively, with the gate electrode 21 tied to one of the source and drain electrodes 19, 23 to provide a current limiting action as is well known. The field effect current limiter is discussed in some detail in U.S. Pat. 3,303,413 issued to R. M. Warner, Jr. et al. and assigned to the present assignee. The current limiter 16 in combination with the clamp circuit 14 provides the charging voltage versus temperature characteristic (FIG. 2) for the DC supply 64. When the ambient temperature is very cold, e.g., between the range of 0° C. and —40° C., the current limiter 16 is conducting maximum current and the Zener diode 20 clamps the voltage at the sense terminal 11 at a maximum value of approximately 15 volts. At approximately 0° C. the Zener diode 20 becomes unclamped, and as the temperature continues to rise, the current limiter 16 becomes less conductive. Since the voltage across the current limiter at point 24 is constant over the temperature range and the voltage drop across resistor 22 continues to decrease with increasing temperature, the diode 32 and input transistor 36 will become conductive for a continuously (and linear) decreasing sense voltage at the sense terminal 11. Thus, the input transistor 36 will be biased conductive for sense voltages ranging from 15 volts at 0° C. to approximately 13.65 volts at 85° C. At approximately 13.65 volts the sense terminal 11 assumes a more positive slope due to the temperature coefficients of the Zener diode 32 and the emitter base junction of transistor 36 in this high temperature range.

In certain field-effect transistors having a given minimum channel thickness, the pinch off current $I_P$ declines with increasing temperature. This is because $I_P$ is directly proportional to carrier mobility, and carrier mobility decreases with increasing temperature for certain ranges of temperature. Carrier mobility in silicon, for example, exhibits a maximum value at a temperature somewhat below room temperature. At very low temperatures, impurity scattering is the dominant mechanism that determines carrier mobility and it becomes more pronounced with decreasing temperature. At higher temperatures, carrier mobility declines with increasing temperature because of phonon scattering.

When the ambient temperature of the regulator circuit decreases, the action of the temperature responsive network 12 will reverse itself and input transistor 36 and level translating diode 32 will become conductive for increasing values of voltage at sense terminal 11 until the clamping level of approximately 15 volts is again reached. The above-described temperature compensation assures that the DC supply 64 for the automobile receives more charging voltage for cold temperatures than for hot temperatures in accordance with the curve shown in FIG. 2. The input transistor 36 becomes more conductive and the Darlington output stage transistor 37 less conductive for increasing temperatures and vice versa for decreasing temperatures, and the charge voltage applied to the DC supply 64 is directly proportional to the time that the Darlington stage 37 is conductive.

Listed in the table below are values for components used in a voltage regulator circuit actually built and successfully tested in accordance with the present invention.

TABLE

| | |
|---|---|
| Resistor: | Value |
| R18 | 1000 ohms. |
| R22 | 2400 ohms. |
| R26 | 1000 ohms. |
| R38 | 1250 ohms. |
| R34 | 1000 ohms. |
| R44 | 1000 ohms. |
| Diode: | |
| D20 | 6.2 volts+. |
| D32 | 8.2 volts—. |
| D30 | 12 volts±10%. |
| D46 | 60 volts+. |
| Current limiter: | |
| Current rating of device 16 | 1.6 milliamperes, Motorola Type Nos. IN5297 through IN5309. |
| Capacitor: | |
| C28 | 0.049 microfarads. |

However, the above table should not be construed as limiting the scope of this invention.

We claim:

1. A temperature responsive automotive voltage regulator including in combination:
   a sense terminal connectable to an automobile DC voltage supply, the voltage level of which is regulated as a function of temperature,
   a current control circuit connected to said voltage supply for controlling the charge current applied thereto,
   a temperature responsive network connected between said sense terminal and said current control circuit for controlling the current flowing from said sense terminal as a function of temperature and controlling the voltage at said sense terminal which is required to change the conductivity of said current control circuit and vary the charging of said voltage, supply, and
      said temperature responsive network including a current limiter connected to said current control circuit, said current limiter having a non-linear current-voltage characteristic with a substantially constant value of limiting current for a range of applied voltages exceeding a predetermined pinch off voltage, said limiting current being temperature dependent and changing in response to changes in the ambient temperature surrounding said temperature responsive network, so that said current limiter functions to vary the conductivity of said current control circuit as a function of temperature.

2. The voltage regulator as defined in claim 1 wherein said temperature responsive network further includes a clamp circuit connected between said sense terminal and said current limiter for clamping the voltage level at said sense terminal at a predetermined value when the current through said current limiter reaches a predetermined level.

3. The voltage regulator circuit as defined in claim 2 wherein said current control circuit includes:
   an output transistor stage connectable to said voltage supply for applying a charging voltage thereto,
   an input transistor connected to said output stage and operatively biased by said temperature responsive network to control the conductivity of said output stage, and said input transistor being conductively controlled by levels of voltage at said sense terminal which are varied in accordance with variations in current through said current limiter.

4. The voltage regulator circuit as defined in claim 3 wherein:

said output stage is connected as a Darlington transistor stage, and said clamp network includes a first resistor connected in series with a first Zener diode between said sense terminal and said current limiter, and a second resistor connected in parallel with said first resistor and first Zener diode, said first Zener diode biased conductive when the voltage at said sense terminal reaches a predetermined level.

5. The voltage regulator as defined in claim 4 which further includes:

an integrating capacitor connected in parallel with said current limiter for integrating the voltage changes thereacross, and a second Zener diode connected between said integrating capacitor and said input transistor for translating the DC level between said current limiter and said input transistor.

6. The voltage regulator as defined in claim 5 which includes a common current source resistor connected to said Darlington stage and to said input transistor, said current source resistor connected to a voltage supply terminal and providing input current to either said Darlington stage or to said input transistor as the voltage level at said sense terminal fluctuates about a given level.

7. The voltage regulator as defined in claim 6 which further includes a flywheel diode connected to the output of said Darlington stage and across the field winding of an AC generator, said flywheel diode clamping the voltage at the output of said Darlington stage to the level of said voltage supply when said Darlington stage is biased nonconductive.

8. The voltage regulator as defined in claim 7 wherein said current limiter is a field-effect diode having source, gate and drain electrodes, said gate electrode connected to one of said source and drain electrodes to provide current limiting action in said temperature responsive network.

References Cited

UNITED STATES PATENTS

| 3,121,837 | 2/1964 | Holm et al. | 322—33 X |
| 3,303,413 | 2/1967 | Warner et al. | 323—4 |
| 3,305,725 | 2/1967 | Huge et al. | 323—9X |

J D MILLER, Primary Examiner

A. D. PELLINEN, Assistant Examiner

U.S. Cl. X.R.

322—33; 323—4, 9, 38